Jan. 5, 1971  A. L. JOHNSTON III, ET AL  3,552,091
APPARATUS FOR PACKAGING ARTICLES IN THERMOPLASTIC
HEAT-SHRINKABLE MATERIALS
Filed Sept. 12, 1968  2 Sheets-Sheet 1
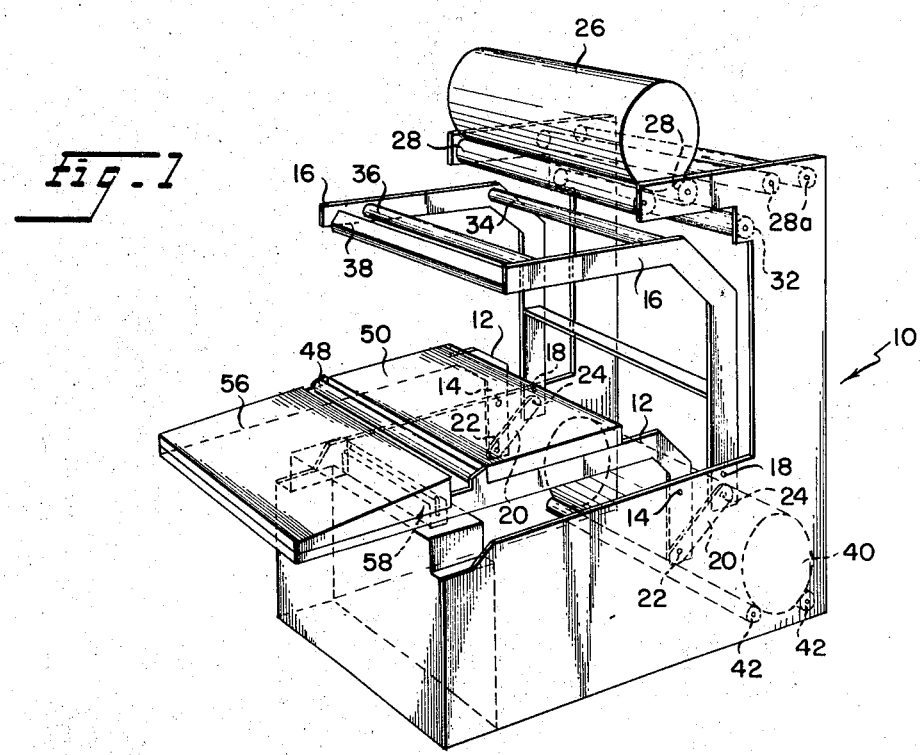
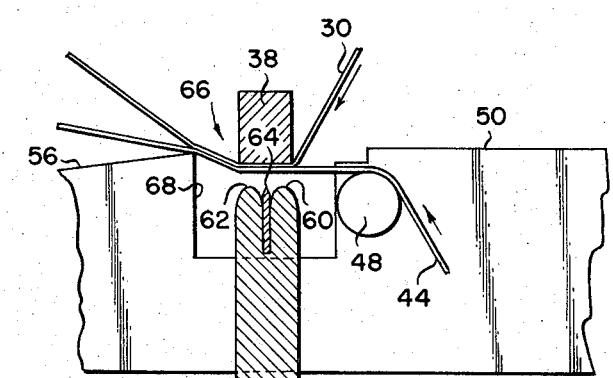
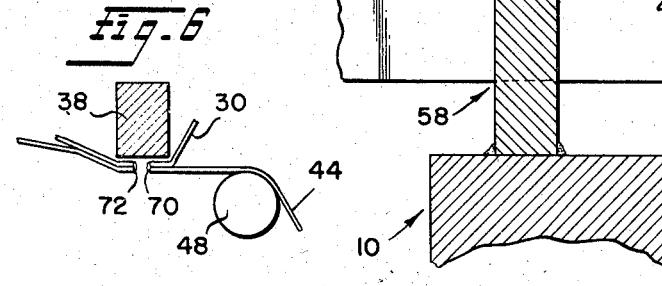
INVENTORS
Andrew Langstaff Johnston, III
Herbert S. Bailey
ATTORNEYS

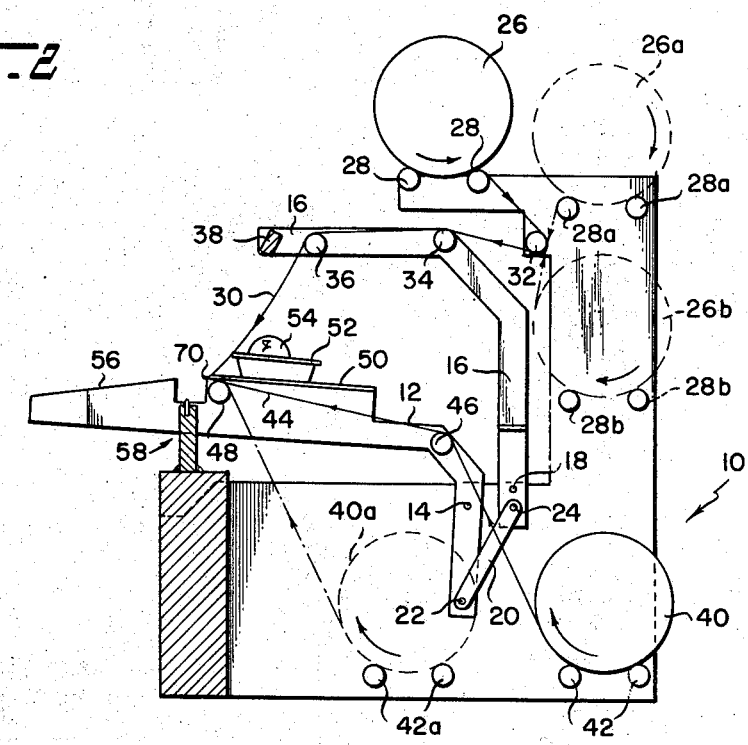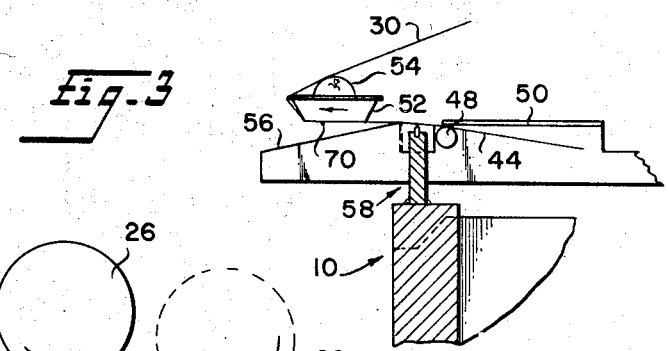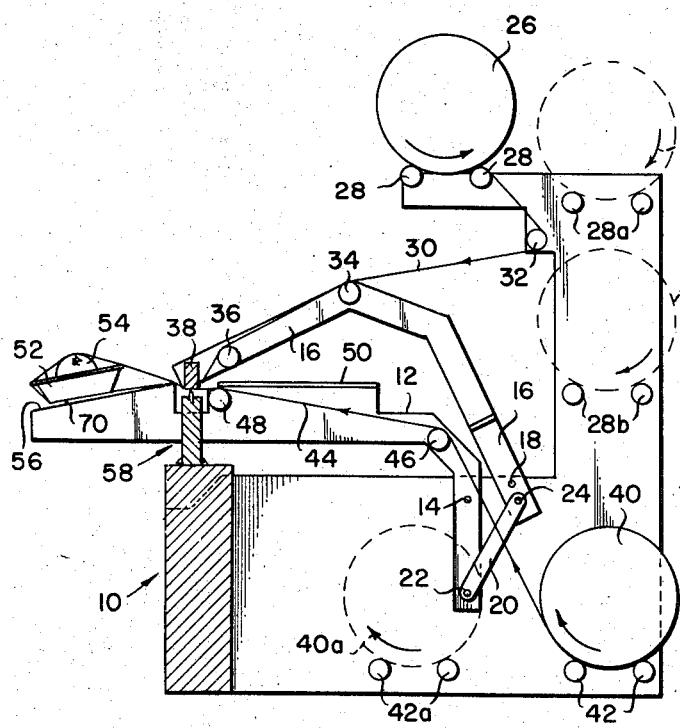

United States Patent Office 3,552,091
Patented Jan. 5, 1971

3,552,091
APPARATUS FOR PACKAGING ARTICLES IN THERMOPLASTIC HEAT-SHRINKABLE MATERIALS
Andrew L. Johnston III, Colonial Heights, and Herbert S. Bailey, Henrico County, Va., assignors to Reynolds Metals Company, Richmond, Va., a corporation of Delaware
Filed Sept. 12, 1968, Ser. No. 759,327
Int. Cl. B65b 13/04
U.S. Cl. 53—198        5 Claims

ABSTRACT OF THE DISCLOSURE

Apparatus for encapsulating articles in heat-shrinkable materials wherein a pair of bipartite web joints are formed on the bottom of a tray carrier. Means are provided to cause an overfeed of an upper source of thermoplastic web material and for preventing any substantial feeding from a lower source of thermoplastic web material after a seal is made between the webs so as to position a heat sealed juncture therebetween for subsequent semi-automatic encapsulation of the article.

---

This invention relates to semi-automatic apparatus for packaging articles and more particularly to apparatus for encapsulating articles in bipartite heat shrinkable films so as to ensure positioning of the film joints on the bottom of the article.

This invention constitutes an improvement over U.S. Pat. 3,172,246 issued to Ruff on Mar. 9, 1965. As is disclosed in the aforementioned patent, it is known to provide a semi-automatic apparatus for providing heat-shrinkable film encapsulation of a tray held product wherein the tray held product is moved manually from an infeed platform to an outfeed platform during which movement the article contacts and feeds a bipartite film from a pair of supply rolls. By manually depressing the outfeed platform, a twin heat sealing and single cutting operation therebetween is effected by interengagement of a twin sealing and cutting means mounted on the base of the apparatus and a pivoted jaw which holds a back-up or pressure bar.

Several deficiencies and shortcomings of the apparatus disclosed by Ruff have been observed in actual practice which are effectively overcome by the present invention. For example, a problem was experienced in getting consistently good seals with the apparatus as disclosed in Ruff, especially manifesting itself in web failure at or near the juncture of the bipartite web. With the angular mounting of the fixed sealing and cut-off jaw it was detected that the thermoplastic web material had a tendency to be dragged across the heated sealing bars. This resulted in a stretching and incipient weakening of the film where contact was made with the sealing bars with a resultant failure of the package frequently occurring especially when the package is subjected to the stresses and strains characteristic for packaging of this type.

This problem has been effectively overcome in the present invention by mounting the dual sealing and cutting member so that its upper surfaces are substantially horizontal and by carefully supporting the film on opposite sides thereof so that there is no inadvertent contact via scraping or dragging of the film across the heated surfaces of the sealing bars. An angular repositioning of the sealing bar insures that a satisfactory back-up means is provided for the sealing elements.

Another shortcoming experienced with the apparatus disclosed in the aforementioned Ruff patent is that the position of the transverse seal between the bipartite webs moves substantially after the seal is made. This results in two conditions, neither of which is satisfactory. First, it locates the joint between the webs at such an elevation that there is a tendency for this joint to be located on the final package above the flange or lip of the tray which holds the product to be packaged and, second, it places the joint between the webs at such an elevation that an attempt to transfer the tray and its contents so as to position the joint below the flange of the tray makes it difficult to pull the web from the upper feed roll. This becomes especially onerous because the majority of operators of the apparatus are female.

The foregoing shortcoming is overcome in accordance with the present invention by providing for an overfeed of thermoplastic web material from the upper supply roll and for preventing any substantial feeding of the thermoplastic web material from the lower supply roll after the webs have been sealed whereby the juncture of the bipartite web remains at an elevation substantially at the opening between the platforms after sealing. The overfeed occurs as the tray-held article is transferred from the outfeed platform to the outfeed platform so that when the outfeed platform is released there will be no further substantial feeding of the thermoplastic web material.

The inherent advantages and improvements of the present invention will become more readily apparent upon considering the following detailed description of the invention and by reference to the drawings in which:

FIG. 1 is a perspective view illustrating a preferred form of the present invention;

FIG. 2 is a side elevational view of the apparatus of FIG. 1 taken in partial cross section;

FIG. 3 is a vertical cross sectional view of a portion of FIG. 2 drawn to an enlarged scale;

FIG. 4 is a side elevational view partially in cross section illustrating a second position of the apparatus; and, FIG. 5 is a vertical cross sectional view showing a portion of FIG. 4 and drawn to an enlarged scale.

Referring now to FIG. 1 of the drawings, there is illustrated a frame indicated generally at 10 for the semi-automatic apparatus of the present invention. Frame 10 supports a pair of pivot arms 12 which are attached to the frame for pivotal movement about pivot point 14. A second pair of arms shown at 16 also pivots with respect to the frame 10 such as at point 18. Links 20 interconnect corresponding elements of pivot arms 12 with those of pivot arms 16 such that a small depression or movement of pivot arms 12 results in a large movement of pivot arms 16. Each link 20 is pinned at 22 to one of the pivot arms 12 and at 24 to one of the pivot arms 16.

An upper feed roll is illustrated at 26 supported by a pair of rollers 28 in the frame 10. Alternate feed roll positions are shown in phantom in FIGS. 2 and 4 at 26a and 26b supported by pairs of rollers 28a and 28b, respectively. An upper thermoplastic web 30 is paid off from upper feed roll 26 and entrained about a common guide roller 32 fixed to frame 10 and a pair of guide rollers 34 and 36 carried by pivot arms 16. There is also illustrated at the end of pivot arms 16 a pressure bar 38 which cooperates to form the thermoplastic seals in a bipartite web in a manner to be described hereinafter.

A lower feed roll is illustrated at 40 supported on a pair of rollers 42. An alternate feed roll position is shown in phantom in FIGS. 2 and 4 at 40a supported by a pair of rollers 42a. A lower thermoplastic web 44 is paid off from lower feed roll 40 and led over guide roller 46 and guide roller 48 at which point it is thermally bonded to the upper thermoplastic web 30 in a manner to be described hereinafter.

An infeed platform 50 in FIG. 2 is illustrated to have a tray 52 placed thereon and an article 54 contained therein. In one form of the present invention an article 54 contained in tray 52 is placed on infeed platform 50 and thereafter manually transferred to an outfeed platform 56 in a manner substantially disclosed in the aforesaid Ruff patent.

A sealing and cut-off means is indicated generally at 58. Sealing and cut-off means 58 as best illustrated in FIG. 5 comprises a first sealing bar surface 60 and a second sealing bar surface 62 disposed on opposite sides of a cut-off knife 64. The sealing and cut-off means 58 is positioned so as to be fixedly secured to the frame 10 by any convenient means such as by welding and to be positioned within an opening 66 between the infeed platform 50 and outfeed platform 56.

A deficiency observed in machines produced in accordance with Ruff 3,172,246 was that a residue accumulated on the cutting blade and sealing bar after it had been in operation for some time. When it was attempted to clean the cutting blade, the blade and sealing bar became damaged to such an extent that inadequate seals were obtained. This problem is overcome effectively in the present invention by using a cut-off knife 64 which is preferably made of aluminum and provided with a surface which prevents a build-up of carbon and film thereon. Such a surface is provided by treating blade 64 with what is referred to as the "Nituff" process by Nimet Industries, Inc. of South Bend, Ind. In this process the surface of blade 64 is anodized with the pores of the anodized film being sealed with a release agent so that film and carbon will not adhere to the blade. The surface of blade 64 thus formed is file hard.

As is shown in FIG. 5, a vertical wall 68 on the outfeed platform 56 has been built up so as to maintain the webs 30 and 44 away from the heated sealing surfaces 60 and 62 so that the plastic film 30 and 33 will not inadvertently contact the heated sealing surface and be weakened thereby. In actual practice a space of 1/4" to 3/8" is provided between the top of cut-off knife 64 and the bottom of pressure bar 38 with the webs of plastic film 30 and 44 horizontal. Also, it will be observed that the upper surfaces of the sealing and cut-off means 58 are substantially in a horizontal plane so that the thermoplastic films 30 and 44 supported in parallel horizontal relationship on one side by guide roller 48 and on the opposite side by the top of vertical wall 68 of the outfeed platform 56 are kept out of the way prior to the final downward movement of pressure bar 38. The latter movement effects a dual seal one of which becomes the trailing seal of a package moved to the outfeed platform 56 and the other becomes the leading seal for the next package.

In operation, and with upper feed roll 26 and lower feed roll 40 in use, the upper thermoplastic web 30 is entrained over guide roller 32 and guide rollers 34 and 36 and led to a bipartite seal 70 which is positioned substantially at the opening 66 between the infeed platform and outfeed platform 56. In similar manner, the thermoplastic web material 44 is led from lower supply roll 40 supported on rolls 42 over guide rollers 46 and 48 to the bipartite seal 70. An article 54 in tray 52 having been placed on infeed platform 50 is then grasped by the operator and with the bipartite seal 70 substantially in the position shown in FIG. 2 the tray 52 and article 54 therein is moved manually to the outfeed platform 56 at which time an overfeed of thermoplastic material from the upper supply roll occurs whereby the bipartite seal 70 will assume the position illustrated in FIGS. 3 and 4 on the bottom of the tray 52. Thereafter, the outfeed platform 56 with the tray 54 thereon is depressed slightly, resulting in a large movement of the pair of pivot arms 16 as contrasted to a small movement for pivot arms 12 whereby sealing bar 38 is brought into operative relation with respect to sealing cut-off means 58. Specifically, sealing bar surfaces 60 and 62 contact the under surface of pressure bar 58 and cut-off knife 64 severs the webs 30 and 34 thereby producing the twin seals 70 and 72 illustrated in FIG. 6.

When the outfeed platform 56 is released, the position of the pivot arms 16 is such that as they are released in order to return to the position shown in FIG. 2 with the aid of suitable springs, not shown, there will not be any substantial feeding of film from either feed roll. Therefore, the bipartite seal 70 remains substantially at the elevation of opening 66 between the infeed and outfeed platforms 50, 56, respectively, that is, substantially the position illustrated at 70 in FIG. 2. The bipartite seal 72 becomes located below the flange of tray 52 after the package and film has been heat shrunk whereby both seals 70 and 72 are below the flange of tray 52 so that any pinholes in the seals will not result in an unsightly leaking of any liquid from within the product contained in the tray.

As has been noted and as is seen best in FIG. 2, it is possible to support a plurality of sources of thermoplastic web materials such as at 26a and 26b supported by corresponding pairs of rollers 28a and 28b. Also, it is possible to use additional means for supporting another source of thermoplastic web material for the lower web material such as is illustrated at 40a in FIG. 2, supported on a pair of rollers 42a. The direction of payoff of thermoplastic film is indicated by the arrows on the respective feed rolls in FIGS. 2 and 4.

It is important to note that a guide roller 32 bears a critical relationship not only to roll 26 but also to alternate sources of supply rolls 26a and 26b whereby the guide roller 32 is located substantially centrally of the feed from whichever upper supply roll is used so as to ensure the overfeed of thermoplastic material from above the infeed platform 50. When the outfeed platform 52 is released which thereby frees the pair of pivot arms 12 and permits restoration of the pair of pivot arms 16 to the FIG. 2 position, it is important to note that there is no substantial lengthening of the film between bipartite seal 70 and guide roller 32 as the pivot arms 16 return to their original position. Stated alternatively, there is an overfeed of web material during the movement of the tray from the infeed platform 50 to the outfeed platform 56 so that the pivot arms 16 may return to their position without disturbing the locus of the bipartite seal 70 from its position substantially at the elevation of the opening 68 between the infeed platform 50 and outfeed platform 56.

A number of modifications are possible in the present invention which include the option of feeding the product from the rear of the machine instead of from the sides as it is presently contemplated. In this embodiment of the invention, the supply roll 26b is completely removed whereby free access is had to the rear of the machine thereby permitting conveyor feeding of articles directly to the infeed platform 50.

While it is preferred to use polyvinyl chloride heat shrinkable film, the invention is applicable to all heat shrinkable films. The thickness of the films customarily ranges from 1/2 mil to 2 mils in large part depending upon the size and fragility of the article being packaged. Since the thermoplastic webs are fed from two sources, it is convenient, and sometimes desirable, to use different thicknesses of film for a single package. For example, packages have been made wherein upper thermoplastic film 30 was 1 mil thick and lower thermoplastic web 44 was 1/2 mil thick. Where different film thicknesses are employed, the thicker film is customarily applied to the upper film.

The maximum sealing bar temperature used is about 375° F. with the normal operating range being from 300–325° F. As would be expected, the thicker films require hotter operating temperatures.

It is believed to be significant that the outfeed platform 56 slopes downwardly from rear to front when the infeed platform 50 is substantially horizontal. This constructional feature is especially beneficial in getting the trailing bipartite seal 72 below the edge or flange of tray 52. When the package is tilted in being moved from the infeed platform 50 to the outfeed platform 56 an excess of film 30 is drawn from the feed roll whether it be 26, 26a or 26b. Therefore, when the film is shrunk whether it be in a shrink tunnel or on a hot plate, the trailing bipartite seal 72 will be below the edge or flange of tray 52. On some containers, when the outfeed platform is not sloped downwardly from rear to front with respect to the infeed platform, an insufficient feeding of film from the upper supply roll occurs whereby the trailing bipartite seal is not positioned beneath the flange of the container when the film is shrunk.

While presently preferred embodiments of the invention have been illustrated and described, it will be recognized that the invention may be otherwise variously embodied and practiced within the scope of the claims which follow.

What is claimed is:

1. A semi-automatic apparatus for feeding a pair of webs of thermoplastic sheet material to encapsulate and thereby package a tray and article means held therein, said apparatus comprising:
   (a) a frame,
   (b) a first pair of arms pivotally mounted to said frame,
   (c) a second pair of arms pivotally mounted to said frame,
   (d) means interconnecting respective ones of said first and second pairs of arms together whereby a small pivoting movement of said first pair of arms results in a large pivoting movement of said second pair of arms,
   (e) a cutting and dual sealing means fixedly mounted to said frame to form a trailing seal for one package and a leading seal for the next package,
      (1) said cutting and dual means having upper surfaces which are substantially horizontal,
   (f) a pressure bar carried by said second pair of arms,
   (g) infeed and outfeed platforms carried by said first pair of arms,
      (1) said infeed and outfeed platforms having an opening therebetween,
   (h) means for supporting at least two sources of supply of thermoplastic web materials a first of which is led from above said infeed platform to said opening between said platforms and a second of which is led from below said infeed platform to form a bipartite web joint between said platforms,
   (j) means for maintaining said first and second web materials at said opening between said platforms substantially horizontal and spaced immediately above the upper horizontal surfaces of said cutting and dual sealing means after said tray-held article means is moved to said outfeed platform,
   (k) said outfeed platform being manually depressed after said tray-held article means is placed thereon, resulting in pivotal movement of said first and second pairs of arms and thereby causing said pressure bar to urge said web materials into cutting and heat-sealing engagement with said cutting and dual sealing means,
      (1) and first guide roller means held by said frame for providing an overfeed of thermoplastic material from above said infeed platform and means for preventing any substantial feeding of said second thermoplastic material after said webs have been sealed whereby the juncture of said bipartite web remains substantially at the elevation of said opening between said platforms after sealing.

2. A semi-automatic apparatus for feeding a pair of webs of thermoplastic material as defined in claim 1 including means for supporting a plurality of sources of thermoplastic web materials capable of being led from above said infeed platform to said opening between said platforms, wherein said first guide roller means held by said frame for providing an overfeed of thermoplastic material from above said infeed platform is located substantially centrally of the feed from said plurality of sources.

3. A semi-automatic apparatus for feeding a pair of webs of thermoplastic sheet material as defined in Claim 1 wherein said means for maintaining said first and second web materials at said opening between said platforms substantially horizontal and spaced immediately above the upper horizontal surfaces of said cutting and dual sealing means includes second guide roller means carried by said first pair of arms and a trailing wall portion of said outfeed platform.

4. A semi-automatic apparatus for feeding a pair of webs of thermoplastic sheet material as defined in claim 1 wherein said means for preventing any substantial feeding of said second thermoplastic material after said webs have been sealed includes third guide roller means carried by said second pair of arms, said first and third guide roller means being so positioned and arranged whereby there is no substantial lengthening of said first web material when said second pair of arms moves from their sealing position to the non-sealing position.

5. A semi-automatic apparatus for feeding a pair of webs of thermoplastic material as defined in claim 1 wherein said outfeed platform slopes downwardly from rear to front with respect to said infeed platform.

References Cited
UNITED STATES PATENTS 3,172,246    3/1965    Ruff _____ 53—198

THERON E. CONDON, Primary Examiner

EUGENE F. DESMOND, Assistant Examiner

U.S. Cl. X.R.

53—182, 390